US011604685B2

(12) United States Patent
Kashiwagi et al.

(10) Patent No.: US 11,604,685 B2
(45) Date of Patent: *Mar. 14, 2023

(54) DATA PROCESSING SYSTEM AND METHOD

(71) Applicant: NIPPON TELEGRAPH AND TELEPHONE CORPORATION, Tokyo (JP)

(72) Inventors: Keiichiro Kashiwagi, Musashino (JP); Hisaharu Ishii, Musashino (JP); Kenji Umakoshi, Musashino (JP); Ryohei Banno, Musashino (JP); Yui Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/471,530

(22) PCT Filed: Dec. 13, 2017

(86) PCT No.: PCT/JP2017/044729
§ 371 (c)(1),
(2) Date: Jun. 19, 2019

(87) PCT Pub. No.: WO2018/116934
PCT Pub. Date: Jun. 28, 2018

(65) Prior Publication Data
US 2019/0317833 A1 Oct. 17, 2019

(30) Foreign Application Priority Data

Dec. 22, 2016 (JP) .............................. JP2016-249737

(51) Int. Cl.
*G06F 9/54* (2006.01)

(52) U.S. Cl.
CPC ........ *G06F 9/541* (2013.01); *G06F 2209/543* (2013.01)

(58) Field of Classification Search
None
See application file for complete search history.

(56) References Cited

U.S. PATENT DOCUMENTS 5,675,805 A * 10/1997 Boldo ...................... G06F 8/30
717/114
6,105,059 A * 8/2000 Al-Karmi ............... G06F 9/548
709/202

(Continued)

FOREIGN PATENT DOCUMENTS

EP            1876793 A2    1/2008
JP         2016-110318 A    6/2016

(Continued)

OTHER PUBLICATIONS

Coilina et al.; "Introducing the QEST broker: Scaling the IoT by bridging MQTT and REST"; 2012; 2012 IEEE 23rd International Symposium on Personal, Indoor and Mobile Radio Communications—(PIMRC); pp. 36-41. (Year: 2012).*

(Continued)

*Primary Examiner* — Umut Onat
(74) *Attorney, Agent, or Firm* — Harness, Dickey & Pierce, P.L.C.

(57) ABSTRACT

A data processing system (10) connected to a plurality of first applications (80) and a plurality of second applications (90) includes a setting information generation function section (20), wherein the setting information generation function section includes a first interface generator (22) configured to generate a first interface for the first applications, a second interface generator (24) configured to generate a second interface for the second applications, and a storage (30) to store common data structure generation source (Continued)

information which is common information based on which the first and second interfaces are generated, and when the common data structure generation source information is updated, the first interface generator and the second interface generator automatically generate the first interface and the second interface, respectively, based on the updated common data structure generation source information.

2 Claims, 6 Drawing Sheets

(56) References Cited

U.S. PATENT DOCUMENTS

| | | | | |
|---|---|---|---|---|
| 6,931,455 | B1* | 8/2005 | Glass | G06F 9/465 |
| | | | | 370/350 |
| 7,373,632 | B1* | 5/2008 | Kawaguchi | G06F 9/465 |
| | | | | 709/203 |
| 9,038,015 | B1* | 5/2015 | Allsbrook | G06F 8/30 |
| | | | | 717/102 |
| 9,602,629 | B2* | 3/2017 | Eliaš | G06F 9/547 |
| 9,672,084 | B2* | 6/2017 | Im | G06F 9/547 |
| 9,712,601 | B2* | 7/2017 | Borges | H04L 67/10 |
| 2002/0184401 | A1 | 12/2002 | Kadel et al. | |
| 2005/0273792 | A1* | 12/2005 | Inohara | G06F 9/548 |
| | | | | 719/330 |
| 2008/0168479 | A1* | 7/2008 | Purtell | G06F 9/45558 |
| | | | | 719/328 |
| 2014/0040923 | A1* | 2/2014 | Tran | G06F 8/30 |
| | | | | 719/328 |
| 2015/0013315 | A1 | 1/2015 | Frederiksen et al. | |
| 2015/0022666 | A1 | 1/2015 | Kay et al. | |
| 2015/0026343 | A1* | 1/2015 | Borges | H04L 67/10 |
| | | | | 709/226 |
| 2015/0106428 | A1* | 4/2015 | Elias | H04L 67/1008 |
| | | | | 709/203 |
| 2015/0296022 | A1 | 10/2015 | Kim et al. | |
| 2016/0004579 | A1* | 1/2016 | Im | G06F 8/41 |
| | | | | 719/330 |
| 2016/0255168 | A1* | 9/2016 | Fausak | H04L 67/025 |
| | | | | 709/203 |
| 2019/0317847 | A1* | 10/2019 | Fujino | G06F 9/547 |

FOREIGN PATENT DOCUMENTS

| | | |
|---|---|---|
| JP | 2016-534607 A | 11/2016 |
| WO | WO-2015/143396 A1 | 9/2015 |

OTHER PUBLICATIONS

International Preliminary Report on Patentability, including the English translation of the Written Opinion, regarding PCT/JP2017/044729, dated Jul. 4, 2019.

Japanese Office Action regarding JP 2018-557710 with English translation, dated Dec. 10, 2019.

International Search Report (in English and Japanese) issued in PCT/JP2017/044729, dated Mar. 6, 2018; ISA/JP.

* cited by examiner

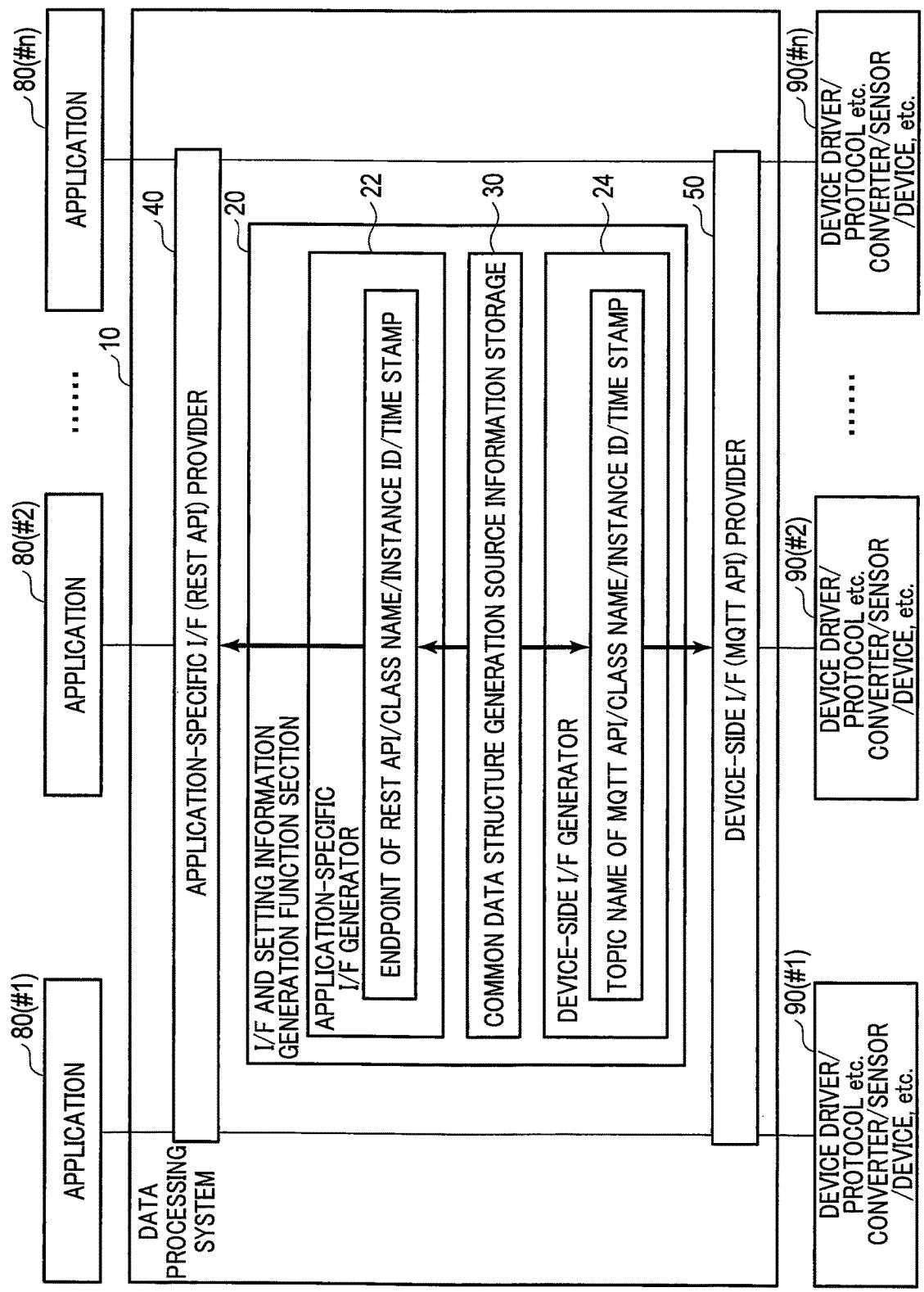
F I G. 2

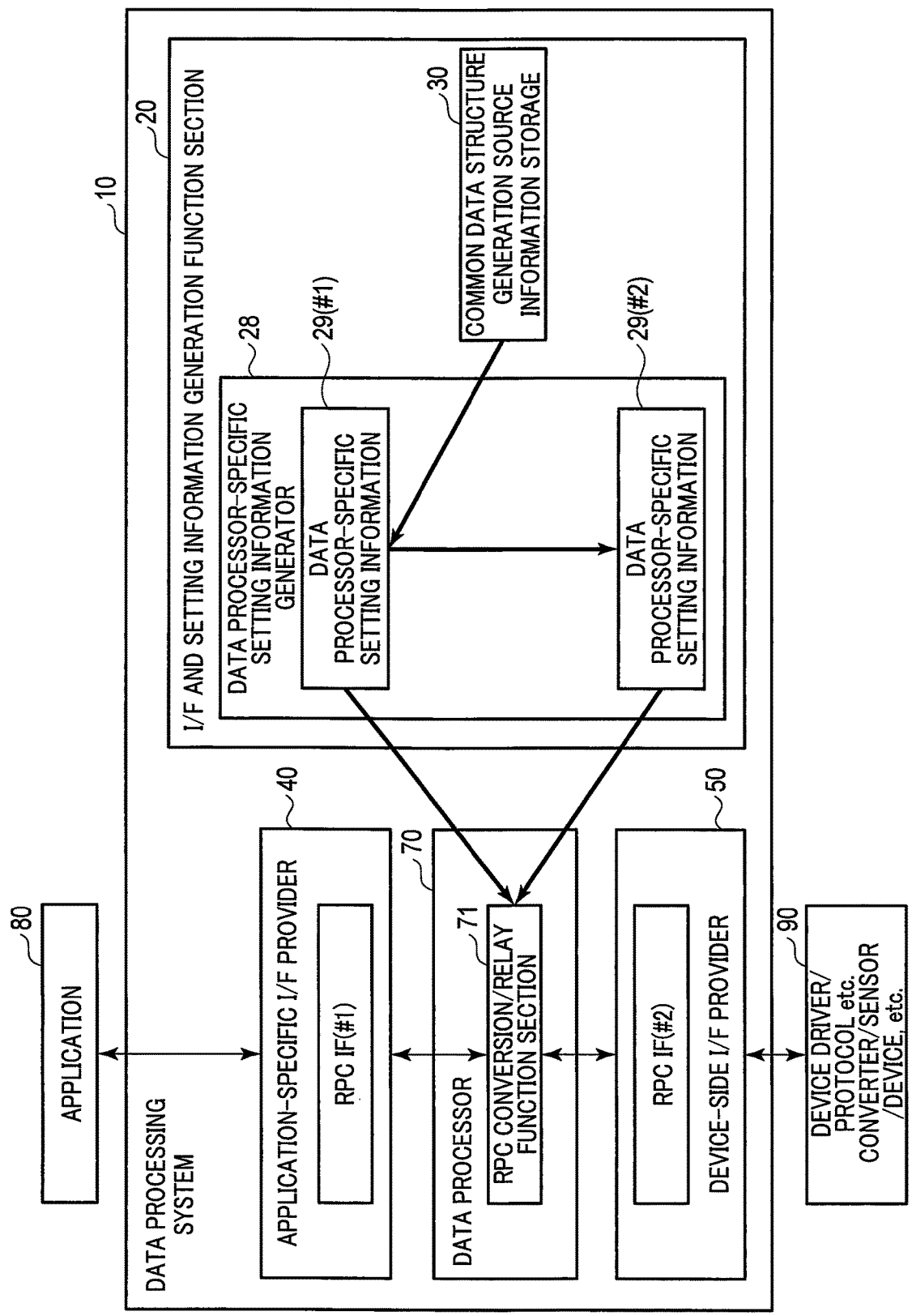
F I G. 4

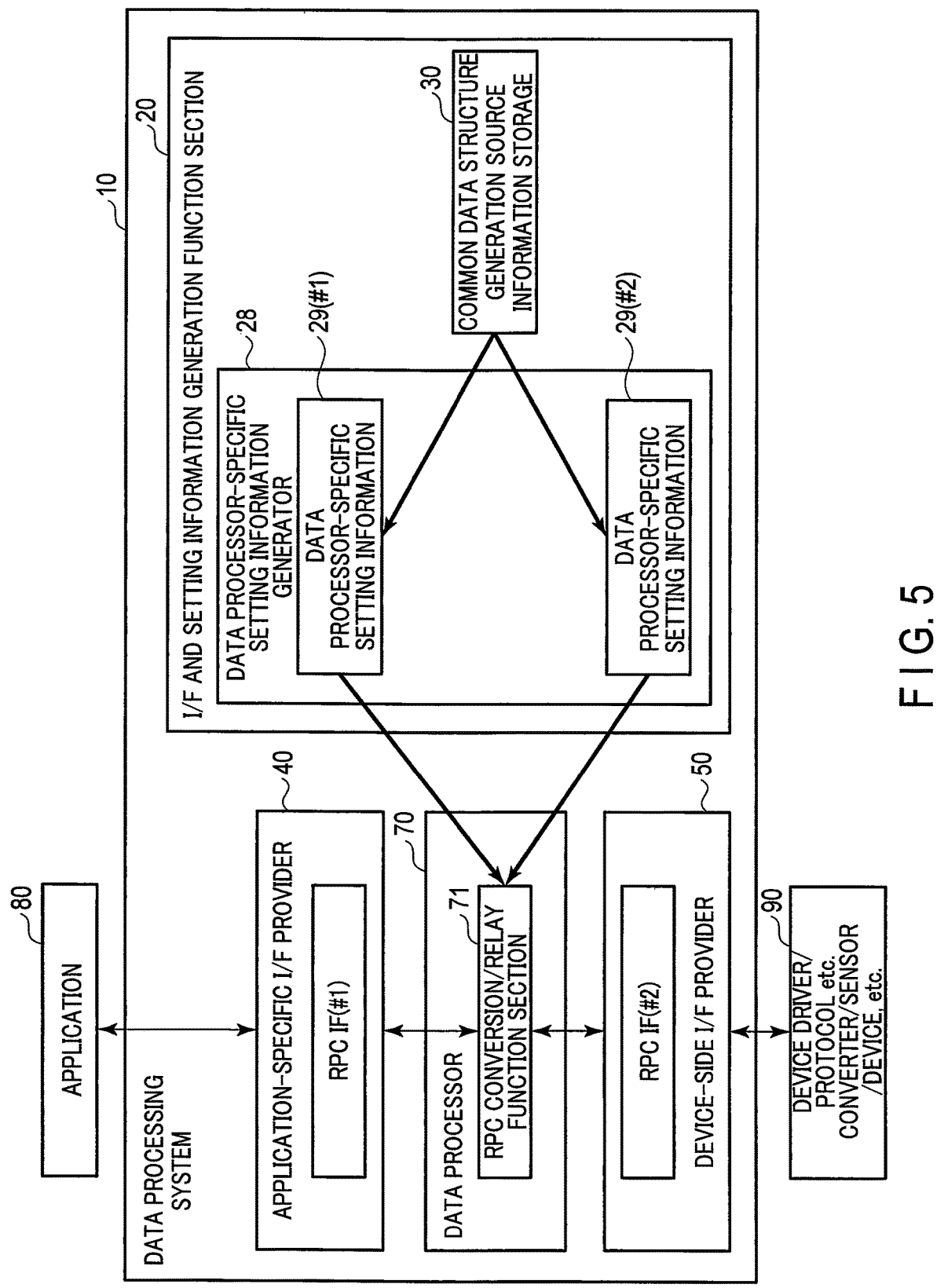
F I G. 5

DATA PROCESSING SYSTEM AND METHOD

CROSS-REFERENCE TO RELATED APPLICATIONS

This is a U.S. National Phase Application under 35 USC 371 of International Application PCT/JP2017/044729 (not published in English), filed Dec. 13, 2017, which claims priority to Japanese Patent Application No. 2016-249737, filed on Dec. 22, 2016. The entire disclosures of the above applications are incorporated herein by reference.

FIELD

The present invention relates to a data processing system and method for a database system, an application, and a sensor, device, etc. in, for example, the IoT field, and particularly relates to a processing system and method for managing interfaces and data structure setting information for an application device, etc.

BACKGROUND

In recent years, IoT which connects various sensors, devices, and the like to a network and utilizes data has attracted attention. Since IoT collects data from various sensors, devices, etc., an interface (hereinafter referred to as an "I/F") for enabling a common data processing system to process data generated by various devices is required.

Furthermore, data collected from these sensors, devices, etc. are used in many applications, but preparation of an individual I/F for each application is costly; therefore, an application I/F for enabling a common data processing system to provide data for various applications is required.

A data processing system connected to a common client-server type application provides an application-specific I/F that can be commonly used by a plurality of applications by using a REST API or the like.

CITATION LIST

Patent Literature

[Patent Literature 1] Jpn. Pat. Appln. KOKAI Publication No. 2016-110318

SUMMARY

However, in the IoT system, many sensors, devices, etc. are connected in addition to applications, and the types and configurations of the connected devices may change frequently; therefore, a change of the data model, and accompanying updating of the device-side I/F for connecting to the application-specific I/F device are required.

That is, in the IoT field, unlike in the conventional client-server type data processing system, various I/Fs need to be managed and updated while maintaining consistency because various application devices, etc. are connected to a common data processing system, and the I/Fs may be updated in response to addition of an application device, or a change in the connection configuration and condition, etc.

In such a case, if the application-specific I/F, device-side I/F, data model, etc. are separately managed and updated, it becomes difficult to maintain symmetry between a plurality of I/Fs, that is, there is a risk of losing consistency between I/Fs, and the operation to maintain and manage consistency between I/Fs increases.

The present invention has been made in view of such circumstances, and is intended to provide a data processing system and method capable of collectively and automatically generating an application-specific interface and a device-specific interface in response to updating of common data structure generation source information, thereby maintaining consistency between interfaces and reducing the management load.

In order to achieve an aforementioned goal, according to a first aspect of the invention, there is provided a data processing system connected to a plurality of first applications and a plurality of second applications. The data processing system includes:

a setting information generation function section, wherein the setting information generation function section includes:

a first interface generator configured to generate a first interface for the first applications;

a second interface generator configured to generate a second interface for the second applications; and a storage to store common data structure generation source information which is common information based on which the first and second interfaces are generated, and when the common data structure generation source information is updated, the first interface generator and the second interface generator automatically generate the first interface and the second interface, respectively, based on the updated common data structure generation source information.

According to a second aspect of the invention, the data processing system according to the first aspect of the invention, further includes:

a first interface provider configured to provide the first interface generated by the first interface generator to the first applications; and a second interface provider configured to provide the second interface generated by the second interface generator to the second applications.

According to a third aspect of the invention, the data processing system according to the second aspect of the invention, further includes:

a data processor configured to store and process data, wherein the setting information generation function section further includes a setting information generator configured to generate one or more types of setting information for the data processor, when the common data structure generation source information is updated, the setting information generator automatically generates the one or more types of setting information based on the updated common data structure generation source information, and outputs the generated one or more types of setting information to the data processor, and the data processor processes the one or more types of setting information, and outputs a processing result to the first and second interface providers.

According to a fourth aspect of the invention, there is provided the data processing system according to the first aspect of the invention, wherein the first and second interface generators symmetrically generate the first interface and the second interface.

According to a fifth aspect of the invention, there is provided a data processing system connected to a plurality of first applications and a plurality of second applications. The data processing system includes:

a data processor configured to store and process data; and a setting information generation function section, wherein
the setting information generation function section includes:
a setting information generator configured to generate setting information for the data processor; and
a storage to store common data structure generation source information which is common information based on which the setting information is generated in the setting information generator, and
when the common data structure generation source information is updated, the setting information generator automatically generates the setting information for the data processor based on the updated common data structure generation source information.

According to a sixth aspect of the invention, there is provided the data processing system according to the fifth aspect of the invention, wherein the setting information generator generates one or more types of the setting information.

According to a seventh aspect of the invention, there is provided the data processing system according to the sixth aspect of the invention, wherein when the setting information generator generates a plurality of types of the setting information, the types of the setting information include first setting information generated based on the updated common data structure generation source information and second setting information generated based on the first setting information.

According to an eighth aspect of the invention, there is provided a data processing method performed by a data processing system connected to a plurality of first applications and a plurality of second applications, wherein
the data processing system is configured to:
store, in a storage, common data structure generation source information which is common information based on which a first interface for the first applications and a second interface for the second applications are generated, and
when the common data structure generation source information is updated, automatically generate the first interface and the second interface based on the updated common data structure generation source information.

According to a ninth aspect of the invention, there is provided the data processing method according to the eighth aspect of the invention, wherein the data processing system provides the generated first interface to the first applications, and provides the generated second interface to the second applications.

According to a tenth aspect of the invention, the data processing method according to the eighth aspect of the invention, wherein the data processing system symmetrically generates the first interface and the second interface.

According to an eleventh aspect of the invention, there is provided a data processing method performed by a data processing system connected to a plurality of first applications and a plurality of second applications, wherein
the data processing system includes:
a data processor configured to store and process data; and
a setting information generation function section, and
the setting information generation function section is configured to:
store, in a storage, common data structure generation source information which is common information based on which setting information for the data processor is generated; and
when the common data structure generation source information is updated, automatically generate the setting information for the data processor based on the updated common data structure generation source information.

According to a twelfth aspect of the invention, there is provided the data processing method according to the eleventh aspect of the invention, wherein the setting information generation function section generates one or more types of the setting information.

According to a thirteenth aspect of the invention, there is provided the data processing method according to the twelfth aspect of the invention, wherein
when a plurality of types of the setting information are generated, the types of the setting information include first setting information generated based on the updated common data structure generation source information and second setting information generated based on the first setting information.

According to the present invention, the first interface for a first application and the second interface for a second application are collectively and automatically generated in response to updating of common data structure generation source information; therefore, a data processing system and method capable of reducing the management load while maintaining consistency between interfaces can be realized.

BRIEF DESCRIPTION OF THE DRAWINGS

FIG. 2 is a conceptual diagram showing a detailed configuration example of the application-oriented I/F generator and the device-side I/F generator.

FIG. 4 is a conceptual diagram showing a detailed configuration example of a data processor-oriented setting information generator and a data processor.

FIG. 5 is a conceptual diagram showing another detailed configuration example of the data processor-specific setting information generator and the data processor.

DETAILED DESCRIPTION

Hereinafter, a data processing system to which a data processing method of an embodiment of the present invention is applied will be described with reference to the drawings.

Figure 1:
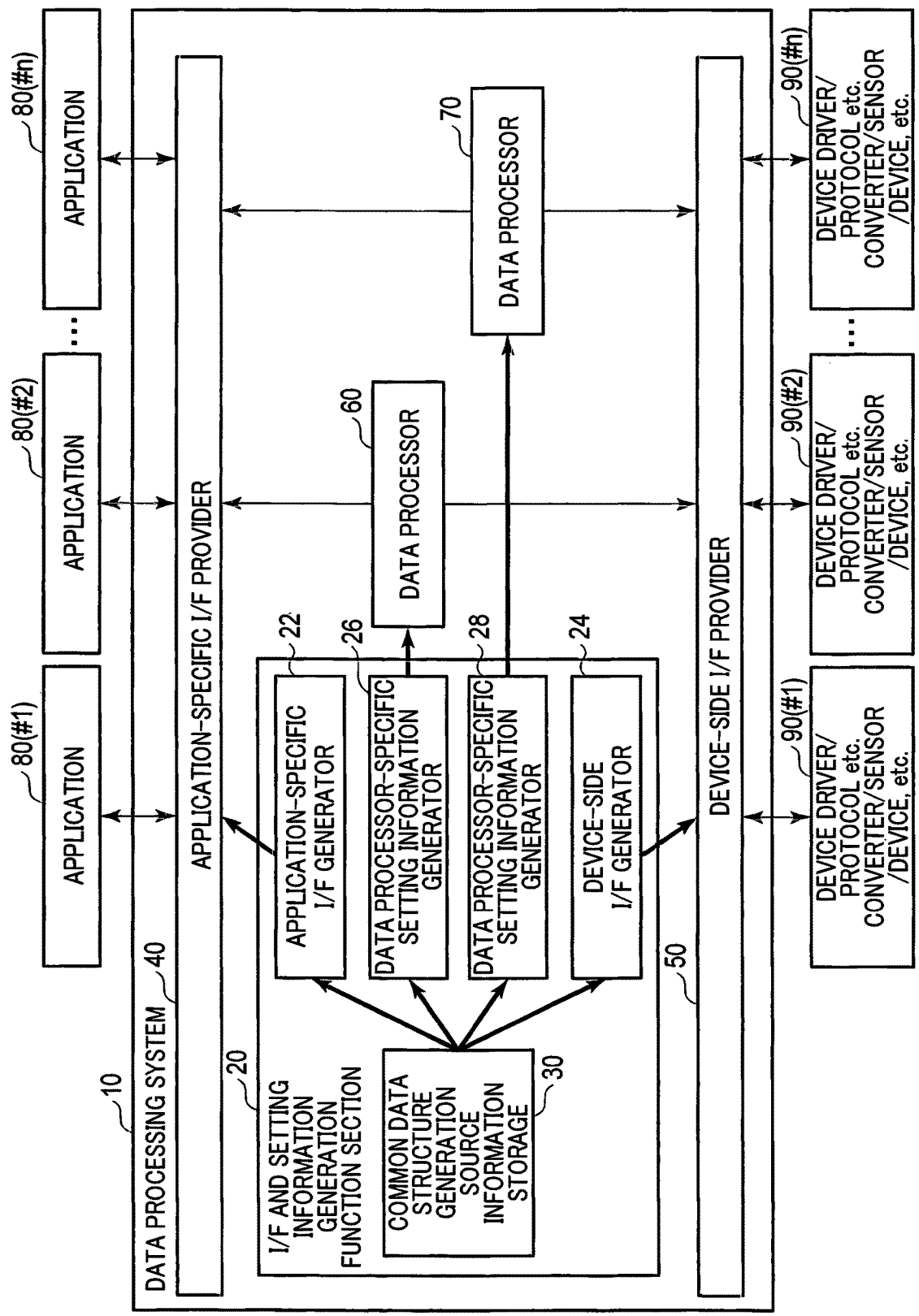
FIG. 1 is a conceptual diagram showing a configuration example of a data processing system to which a data processing method of an embodiment of the present invention is applied.

FIG. 1 is a conceptual diagram showing a configuration example of a data processing system to which a data processing method of an embodiment of the present invention is applied.

The data processing system 10 includes five function sections, that is, an I/F and setting information generation function section 20, an application-specific I/F provider 40, a device-side I/F provider 50, data processor 60, and data processor 70, or part thereof.

The I/F and setting information generation function section 20 includes four function sections, that is, an application-specific I/F generator 22, a device-side I/F generator 24, data processor-specific setting information generator 26, and data processor-specific setting information generator 28, or part thereof.

The I/F and setting information generation function section 20 also includes a common data structure generation source information storage 30 configured to store common data structure generation source information which is common information based on which setting information, etc. of the application-specific I/F generator 22, device-side I/F generator 24, data processor-specific setting information generator 26, and data processor-specific setting information generator 28 is generated, or a file describing the common data structure generation source information. The data structure generation source information may be a csv file that defines a class, an attribute, a relation, and a json file that defines a relation between instances.

The application-specific I/F generator 22, the device-side I/F generator 24, data processor-specific setting information generator 26, and data processor-specific setting information generator 28 generate various information based on the common data structure generation source information stored in the common data structure generation source information storage 30, or the file describing the common data structure generation source information.

That is, the application-specific I/F generator 22 generates an application-specific I/F or API, and outputs it to the application-specific I/F provider 40. The device-side I/F generator 24 generates an I/F or API for a device driver/protocol, etc. converter/sensor/device, etc., and outputs it to the device-side I/F provider 50.

FIG. 2 is a conceptual diagram particularly showing a detailed configuration example of the application-specific I/F generator 22 and the device-side I/F generator 24.

The application-specific I/F generator 22 automatically generates a REST API, which is an application-specific I/F, from the common data structure generation source information stored in the common data structure generation source information storage 30.

Specifically, the application-specific I/F generator 22 uses a csv file that defines a class, an attribute, and a relation and a json file that defines a relation between instances as common data structure generation source information, and collectively generates an instance ID from a device ID and internal name uniquely specified in one device.

The application-specific I/F generator 22 further generates collectively an application-specific I/F (such as an endpoint of a REST API) from the class name, instance ID, and time stamp. The application-specific I/F generator 22 may also automatically generate an API document in the format of json, vmal, etc. by swagger or the like.

The device-side I/F generator 24 further generates collectively a device-side I/F (such as a topic of an MQTT API) from the instance ID and time stamp.

Specifically, the device-side I/F generator 24 also uses a csv file that defines a class, an attribute, and a relation and a json file that defines a relation between instances as common data structure generation source information, and collectively generates an instance ID from the device ID and internal name uniquely specified in one device.

Figure 3:
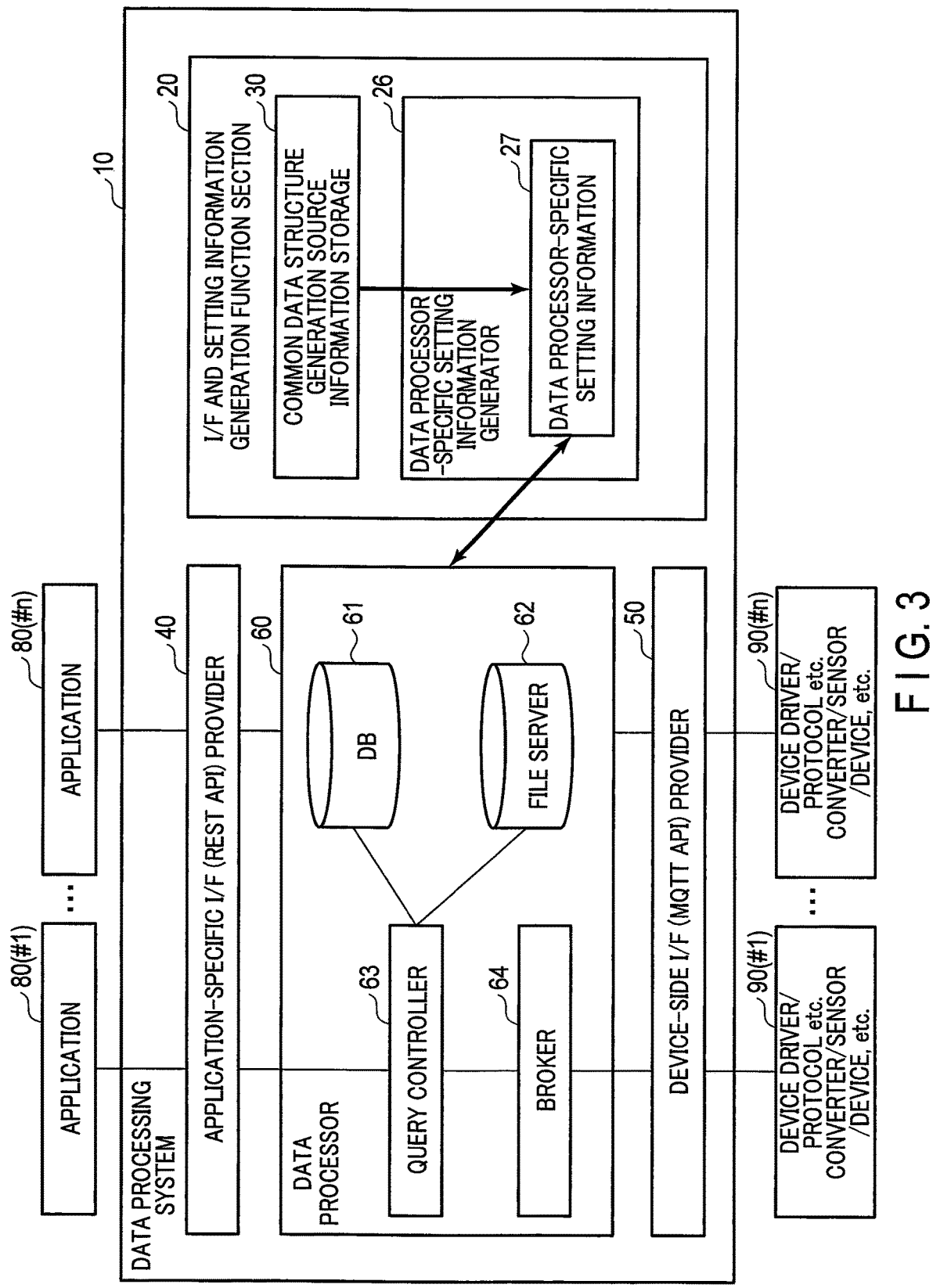
FIG. 3 is a conceptual diagram showing a detailed configuration example of a data processor-oriented setting information generator and a data processor.
Figure 6:
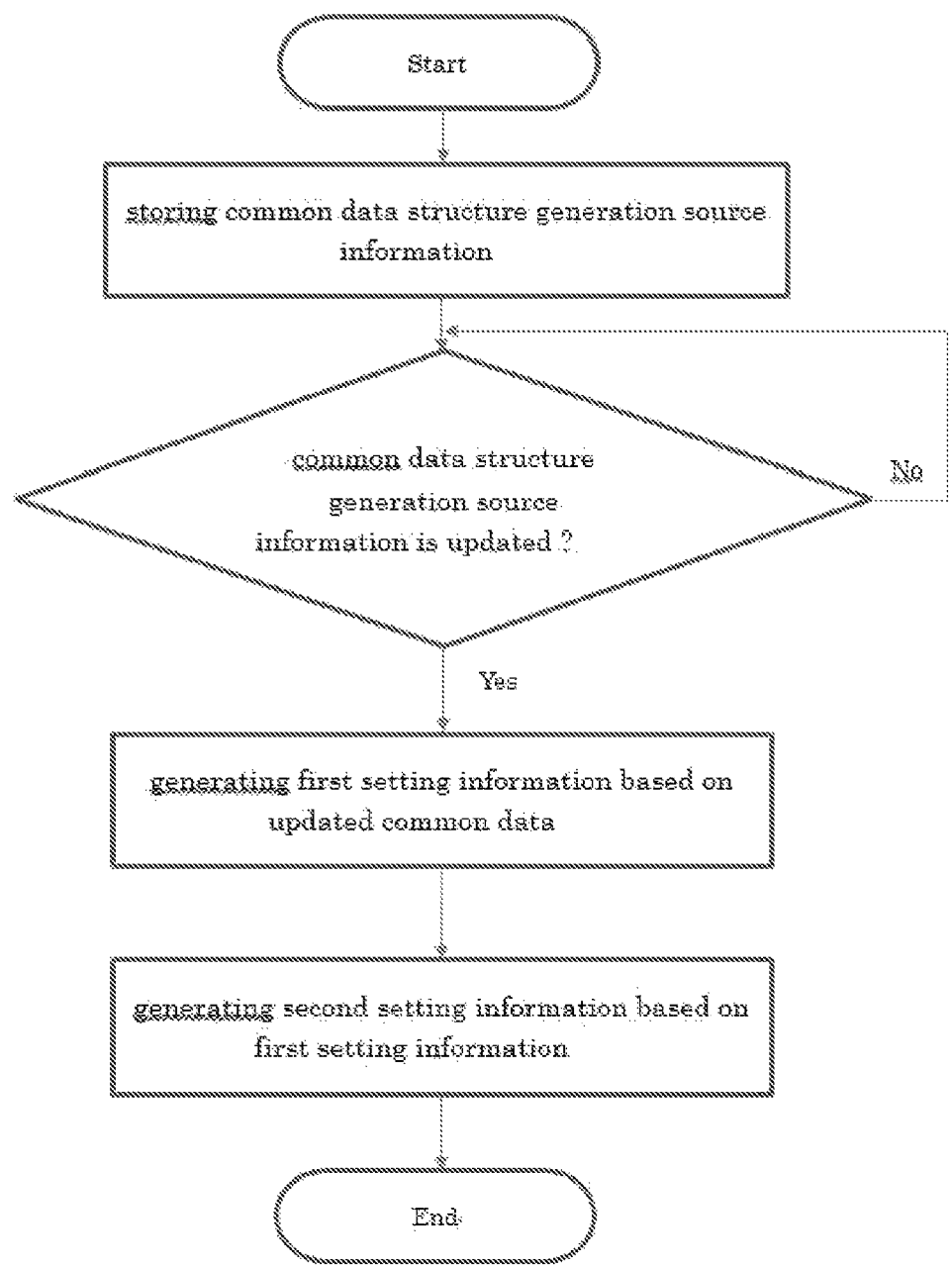
FIG. 6 is a flowchart depicting an example data processing method.

In this way, the data processing system 10 automatically generates a REST API, which is an application-specific I/F, and an MQTT API, which is a device-side I/F, symmetrically as follows:

1. endpoint of REST API/class name/instance ID/time stamp
2. topic name of MQTT API/class name/instance ID/time stamp FIG. 3 is a conceptual diagram showing a detailed configuration example of data processor-specific setting information generator 26 and data processor 60.

Data processor-specific setting information generator 26 generates data processor-specific setting information 27 from a csv file that defines a class, which is included in the common data structure generation source information stored in the common data structure generation source information storage 30, and outputs it to data processor 60.

Data processor 60 includes a database (hereinafter referred to as "DB") 61, a file server 62, a query controller 63, and a broker 64.

The file server 62 stores data processor-specific setting information 27 output from data processor-specific setting information generator 26. The DB 61 acquires data output from an application 80 via the application-specific I/F provider 40 and the query controller 63, and stores it. The DB 61 also acquires data output from the device driver/protocol etc. converter/sensor/device 90 via the device-side I/F provider 50, the broker 64, and the query controller 63, and stores it.

The query controller 63 determines a type of the data stored in the DB 61 based on the data processor-specific setting information 27 stored in the file server 62, and performs data storing or searching on the DB 61 having an appropriate property determined in advance in accordance with the characteristics of each type of data. Therefore, the data processor-specific setting information 27 stored in the file server 62 may be setting information in a format that enables the query controller 63 to determine whether the data is binary or not (a csv file or the like that defines classes, and defines whether each class is binary data or not).

For example, the type of data includes structured sensor data such as json and binary format media data such as an image. Either type of data is output from the device driver/protocol etc. converter/sensor/device 90, and stored in the DB 61. The query controller 63 determines whether the data stored in the DB 61 is sensor data or media data based on the data processor-specific setting information 27 stored in the file server 62.

The data processor-specific setting information 27 is not necessarily stored in the file server 62, and may be stored in a local memory (not shown) provided in data processor 60. Alternatively, it may be stored in the DB 61 or the query controller 63. In such a case, upon generating the data processor-specific setting information 27, data processor-specific setting information generator 26 writes the data processor-specific setting information 27 in a memory (not shown) of the DB 61 or the query controller 63. Alternatively, the data processor-specific setting information 27 may be acquired by making an inquiry from the DB 61 or the query controller 63 to data processor-specific setting information generator 26.

The broker 64 processes data determined to be binary by the query controller 63 by using setting information such as the data processor-specific setting information 27 stored in the file server 62. Then, the broker 64 provides the processing result to the device-side I/F provider 50 and/or to the application-specific I/F provider 40 via the query controller 63.

FIG. 4 is a conceptual diagram showing a detailed configuration example of data processor-specific setting information generator 28 and data processor 70.

Data processor-specific setting information generator 28 generates data processor-specific setting information 29(#1) from the common data structure generation source information stored in the common data structure generation source information storage 30. Data processor-specific setting information 29(#1) is setting information corresponding to the protocol or network of the application, which is necessary to automatically generate the code of an RPC conversion relay function section 71 provided in data processor 70 and data processor-specific setting information 29(#2). Data processor-specific setting information 29(#1) may also be IDL of gRPC.

Data processor-specific setting information generator 28 outputs data processor-specific setting information 29(#1) to the RPC conversion relay function section 71 of data processor 70. Based on data processor-specific setting information 29(#1), data processor-specific setting information generator 28 may also automatically generate RPC IF (#1) included in the application-specific I/F provider 40, and a code of the RPC conversion relay function section 71 or part thereof.

Data processor-specific setting information generator 28 further generates data processor-specific setting information 29(#2) based on data processor-specific setting information 29(#1). Data processor-specific setting information 29(#2) is setting information generated from data processor-specific setting information 29(#1) and corresponding to the protocol or network of the device driver/protocol etc. converter/sensor/device 90, etc. Data processor-specific setting information 29(#2) may be setting information such as MQTT RPC schemer.

FIG. 5 is a conceptual diagram showing another detailed configuration example of data processor-specific setting information generator 28 and data processor 70.

As shown in FIG. 5, depending on the contents of the common data structure generation source information, data processor-specific setting information generator 28 may generate data processor-specific setting information 29(#2) not based on data processor-specific setting information 29(#1).

As shown in FIG. 4 or 5, upon generating data processor-specific setting information 29(#2), data processor-specific setting information generator 28 may automatically generate RPC IF (#2) included in the application-specific I/F provider 50 and a code of the RPC conversion relay function section 71 or part thereof, based on data processor-specific setting information 29(#2).

Data processor 70 performs, in the RPC conversion relay function section 71, data processing on the setting information, I/F, code, etc. output from data processor-specific setting information generator 28 by an RPC or the like. Then, data processor 70 provides the processing result to the application-specific I/F provider 40 and/or the device-side I/F provider 50.

The application-specific I/F provider 40 provides the application-specific I/F or API output from the application-specific I/F generator 22, and the processing results output from data processors 60 and 70 to the application 80.

The device-side I/F provider 50 provides the I/F or API for the device driver/protocol etc. converter/sensor/device, etc. 90 output from the device-side I/F generator 24, and the processing results output from data processors 60 and 70 to the device driver/protocol etc. converter/sensor/device, etc. 90.

In this manner, the data processing system 10 collectively and symmetrically generates I/Fs or APIs for the application 80 and device driver/protocol etc. converter/sensor/device, etc. 90, and setting information for data processors 60 and 70, or part thereof. In addition, the data processing system 10 automatically generates an API document, a source code of a data processor, etc., a setting file, or part thereof.

Furthermore, in the data processing system 10, when the common data structure generation source information stored in the common data structure generation source information storage unit 30 is updated, the application-specific I/F generator 22, the device-side I/F generator 24, data processor-specific setting information generator 26, and data processor-specific setting information generator 28 automatically generate an application-specific I/F, a device-side I/F, data processor-specific setting information 27, and data processor-specific setting information 29, respectively, based on the updated common data structure generation source information in the above-described manners. In this manner, when the common data structure generation source information is updated, the data processing system 10 collectively and automatically generates an API for the application 80 and an API for the device driver/protocol etc. converter/sensor/device, etc. 90 without any discordance.

As described above, the data processing system 10 utilizes the characteristics of IoT in which many types of application devices are connected to a common data processing system to separate the application-specific I/F generator 22 and the device-side I/F generator 24 from the data processing system (data processors 60 and 70), and collectively and automatically generate consistent I/Fs and setting information, codes, documents, etc. based on the common data structure source generation information stored in the common data structure source generation information storage 30, thereby enabling to flexibly deal with the connection configuration change of the device server/protocol etc. converter/sensor/device, etc. 90, addition of an application 80, and a change of a data model, or the like and also enabling to reduce the operation to maintain consistency between the I/Fs of the entire data processing system 10.

Therefore, use of the data processing system to which the data processing method of the present embodiment is applied enables construction of a common data storage processing system that can be flexibly connected to various application devices and an IoT platform based thereon.

The present invention is not limited to the above embodiments as they are, and can be embodied by modifying structural elements in the implementation stage without departing from the gist thereof. Various inventions can be formed by appropriate combinations of multiple structural elements disclosed in the above embodiments. For example, some structural elements may be deleted from all the structural elements described in the embodiments. Furthermore, structural elements over different embodiments may be appropriately combined.

For example, one system may be realized by any or all of the system configurations shown in FIGS. 2, 3, 4, and 5, or by combining two or more data processors in parallel.

The invention claimed is:

1. A data processing system connected to a plurality of first applications and a plurality of second applications, the data processing system comprising:
   a data processor configured to store and process data; and
   a setting information generation function section, wherein the setting information generation function section includes:
   a setting information generator configured to generate a first and a second setting information for the data processor; and
   a storage to store common data structure generation source information which is common information based on which the first setting information is generated in the setting information generator, and
   when the common data structure generation source information is updated, the setting information generator automatically generates the first setting information based on the updated common data structure generation source information, and the second setting information based on the generated first setting information, wherein a first interface for the plurality of first applications is generated based on the first setting information, and a second interface for the plurality of second applications is generated based on the second setting information, wherein the first interface is a representational state transformer (REST) application programming interface (API) and the second interface is a message queuing telemetry transport (MQTT) API, and wherein the REST API and the MQTT API are automatically generated symmetrically.

2. A data processing method performed by a data processing system connected to a plurality of first applications and a plurality of second applications, the method comprising:

the data processing system storing, in a storage, common data structure generation source information which is common information based on which a first setting information for a data processor of the data processing system is generated; and when the common data structure generation source information is updated, the data processing system automatically generating the first setting information based on the updated common data structure generation source information, and a second setting information for the data processor based on the generated first selling information, wherein a first interface for the plurality of first applications is generated based on the first setting information, and a second interface for the plurality of second applications is generated based on the second setting information, wherein the first interface is a representational state transformer (REST) application programming interface (API) and the second interface is a message queuing telemetry transport (MATT) API, and wherein the REST API and the MQTT API are automatically generated symmetrically.

* * * * *